(12) United States Patent
Law

(10) Patent No.: US 6,437,738 B1
(45) Date of Patent: Aug. 20, 2002

(54) HEXAGONAL-ANNULUS PHASED ARRAY ANTENNA FOR RADAR WIND PROFILING ON MOVING PLATFORMS

(76) Inventor: Daniel C. Law, 185 S. 35th St., Boulder, CO (US) 80303

( * ) Notice: Subject to any disclaimer, the term of this patent is extended or adjusted under 35 U.S.C. 154(b) by 0 days.

(21) Appl. No.: 09/781,768

(22) Filed: Feb. 12, 2001

(51) Int. Cl.[7] .................................................. H01Q 3/26
(52) U.S. Cl. ....................................................... 342/373
(58) Field of Search ................................. 342/373, 368, 342/372

(56) References Cited

U.S. PATENT DOCUMENTS

| | | | | |
|---|---|---|---|---|
| 4,335,388 A | * | 6/1982 | Scott et al. | 342/379 |
| 4,633,256 A | * | 12/1986 | Chadwick | 342/368 |
| 4,901,085 A | * | 2/1990 | Spring et al. | 342/373 |
| 5,347,287 A | | 9/1994 | Speciale | |
| 6,037,910 A | | 3/2000 | Solbach et al. | |
| 6,295,026 B1 | * | 9/2001 | Chen et al. | 342/368 |

* cited by examiner

Primary Examiner—Thomas H. Tarcza
Assistant Examiner—Fred H. Mull
(74) Attorney, Agent, or Firm—Robert G. Lev

(57) ABSTRACT

The inventive antenna uses a high-speed phased-array beam steering technique. By virtue of its geometry and the non-uniform power distribution throughout its many identical elements, the present invention achieves an ability to compensate for platform motion. The present invention also greatly reduces interference from low-angle antenna pattern sidelobes, notably ground- and sea-clutter. These are crucial characteristics for an accurate radar wind profiler.

8 Claims, 5 Drawing Sheets

HEXAGONAL-ANNULUS PHASED ARRAY ANTENNA FOR RADAR WIND PROFILING ON MOVING PLATFORMS

TECHNICAL FIELD

The present invention is generally related to the field of wind speed measurement systems. In particular, the present invention is directed to an improved radar configuration having features that compensate for certain environmental factors in order to achieve an accurate wind profiling.

BACKGROUND ART

Conventional radar wind profilers typically are surface-mounted and direct a number of beams vertically or slightly off vertical. Signals are obtained from refractive index inhomogeneities in the clear atmosphere, or from particulates in the air. Because these scatterers often move with the wind, the signals returned to the pulsed radar are Doppler-shifted. By measuring the Doppler shift in the radar beams pointed in different directions as a function of time after radar pulses are transmitted, the horizontal and vertical wind vectors can be calculated as a function of height above the radar.

A conventional example of a wind profiling system uses triangular geometry as depicted in a 1961 IEEE article (Ed Sharp, IEEE *Transactions on Antenna Propagations*, AP-9, pages 126–129). The subject article, incorporated herein by reference, describes a triangular arrangement of planer-array antenna elements. The purpose of this arrangement is to reduce the number of antenna elements needed to obtain useful measurements.

Placement of wind profiling systems on moving platforms such as ships or planes creates an additional level of complexity often leading to inaccurate systems. The only known 915 MHZ wind profilers that have been successfully operated on ships have mounted the radar's antenna on a flat panel that is isolated from the ship's deck by a mechanical 3-axis gyroscope, which mechanically stabilizes the panel with respect to the horizon despite ship motion. This arrangement is described in an article in *The Bulletin of American Meteorological Society* (No. 73, pages 1587–1592, by D. A. Carter, W. L. Ecklund, K. S. Gage, M. Spoward, H. L. Cole, E. F. Chamberlain, W. F. Dabberdt, and J. Wilson, 1992). This article is incorporated herein by reference, and describes the first test of a shipboard wind profiler. The mechanism described in the subject publication is expensive and large, and typically includes a large surrounding clutter fence to reduce sidelobe interference. The size of the installations has been in the range of 3.5 L×3.5 W×3 H (all in meters).

Signal interference through sidelobes on these shipboard installations severely degrades wind measurement products in the marine boundary layer below an altitude of 800 meters, an altitude range where accurate wind measurement is most needed. This situation is described from an article in the publication *The Journal of Atmospheric and Oceanic Technology* (No. 15, pages 826–834, by L. M. Hartten, 1998). This publication is incorporated herein by reference, and describes the reconciliation of surface and profiler winds at various types of sites.

The commercial antennas used in the installations of the above-cited publications are considered state-of-the-art. The design concepts behind these antennas are described in an article published in the IEEE *Transactions on Antennas and Propagation* (AP-31, 190–193, by J. Ashkenazy, P. Perlmutter and D. Treves, 1998). This article is incorporated herein by reference, and describes a modular approach for the design microstrip array antennas.

Most such radars in use today typically produce a change in beam direction by mechanically deploying different lengths of cable between the transmitter and a few antenna segments. They are incapable of switching quickly between radar pulses (spaced less than 1 ms apart) and can obtain only 3–5 different beam-pointing directions since each direction requires a different combination of cable lengths. Thus, such arrangements cannot easily compensate for platform motion e.g., on ships, planes and buoys. This is critical since some wind profiling systems may require the ability to move beams rapidly (every 100 ms) to any one of thousands of possible directions, depending on the instantaneous orientation of the moving platform.

For all radar antennas, particularly those only a few wavelengths in diameter, energy leaks out of the main beam on transmission. This energy leaks into the antenna from many undesirable directions on reception. These unwanted leaks, called sidelobes, cause interference to the desired atmospheric signals in the main beam which are often quite weak. As a result, the sidelobes severely degrade the quality of the resultant wind profile data.

SUMMARY OF THE INVENTION

Accordingly it is one object of the present invention to overcome the limitations of the conventional art, thereby providing a far more accurate and flexible wind profiling radar system.

It is another object of the present invention to provide a wind profiling system that eliminates the necessity of mechanical gyroscopes and other mechanical peripherals necessary in the conventional art.

It is a further object of the present invention to provide a wind profiling system that substantially compensates for environmental motion of the platform on which the system is located.

It is an additional object of the present invention to provide a wind profiling system that has side lobes that are substantially reduced compared to those of the conventional art.

It is yet another object of the present invention to provide a wind profiling system capable of handling rapid variations in environmental movement.

It is again another object of the present invention to provide a wind profiling system having a reduced size compared to conventional arrangements.

It is still an additional object of the present invention to provide a wind profiling system having a smaller "footprint" and requiring less material than conventional systems.

It is again another object of the present invention to provide a wind profiling system that can be deployed in a nadir-pointing configuration on aircraft.

It is yet a further object of the present invention to provide a wind profiling system that can be easily mounted on a ship or open-ocean buoy.

These and other goals and objects of the present invention are achieved by a phased array antenna system having a plurality of transmit/receive radiator elements. These elements are arranged in a two-dimensional hexagonal configuration matrix.

Another aspect of the present invention is manifested by a method of operating a phased array antenna system having a plurality of transmit/receive radiator elements. The method of operation includes the step of applying power to the antenna radiator elements in a non-uniform manner.

DETAILED DESCRIPTION OF THE PREFERRED EMBODIMENT

This invention uses high-speed phased-array beam steering techniques (not new) in combination with an hexagonal annulus antenna radiator element pattern or matrix. A non-uniform power distribution pattern is used, to obtain an antenna matrix with drastically reduced sidelobes, and which is also capable of motion compensation on rapidly moving platforms.

Figure 1:
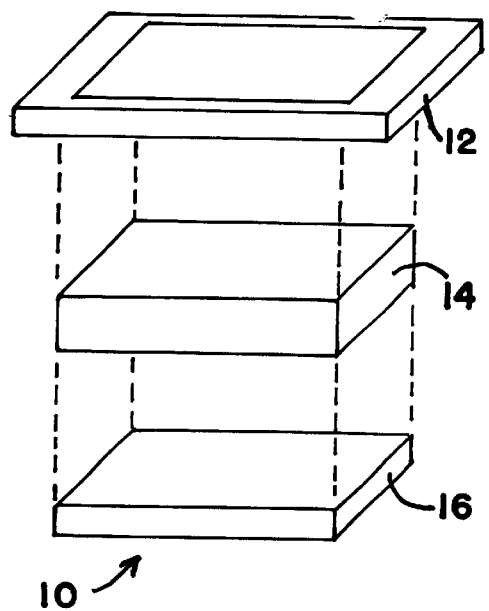
FIG. 1 is an exploded perspective diagram depicting the parts of each antenna radiator element.

Each self-contained antenna radiator 10 element is arranged for both transmission and reception, and is constituted as depicted in FIG. 1. There are four functions arranged among the three depicted circuit boards. The first element is a micropatch radiator 12, which is used for both transmitting and reception. The next part is preferably a four-bit diode phase shifter 14. However, other types of phase shifters can be used within the concept of the present invention. As is standard with all such phase shifters, a driver is necessary. The function of the phase shifter driver is contained within board 14. The operation of the radiator element 10 is controlled by a micro controller 16. In the present embodiment of the present invention this is a eight-bit device. However, other devices capable of the same control function can be used within the concept of the present invention. It should be noted that while the depicted board is preferred for one embodiment of the present invention, the invention is not limited thereby. Rather, it is the overall functionality of a matrix of such antenna radiator elements 10 that constitute the novel operation of the present invention.

Figure 2:
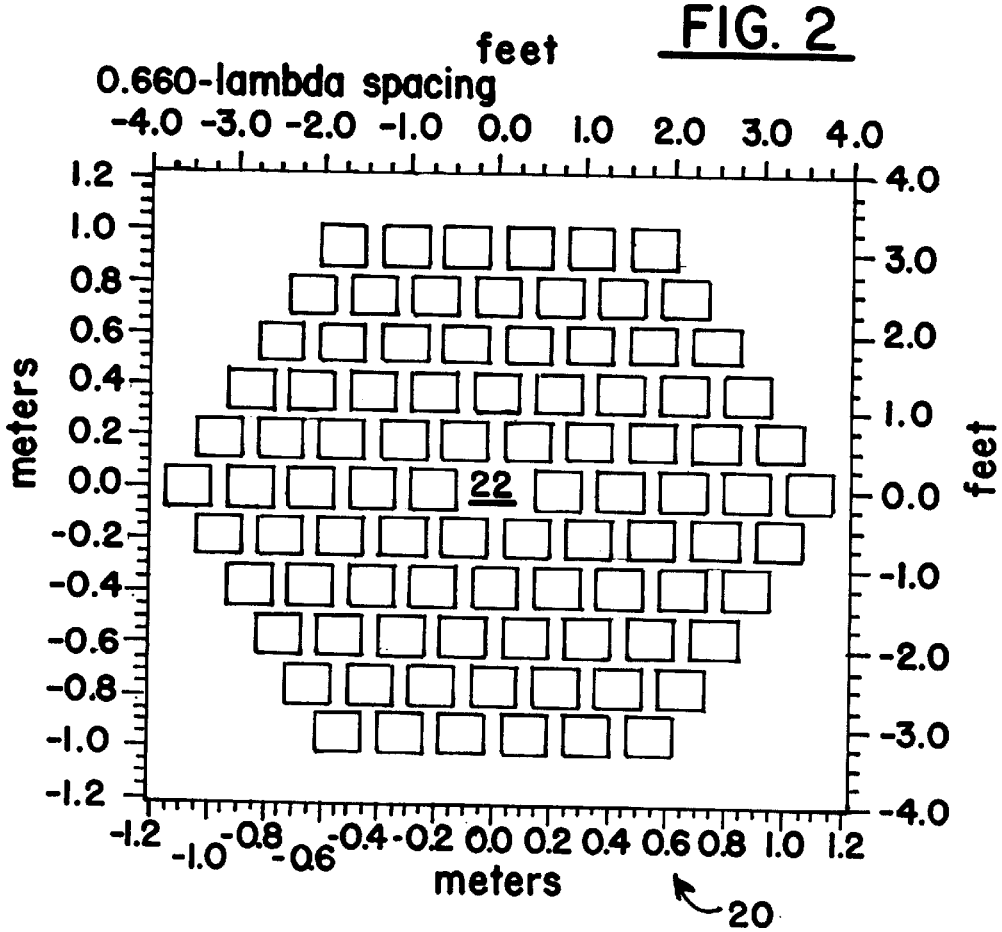
FIG. 2 is a top-view diagram depicting the spacing and arrangement of the antenna radiator element.

The antenna radiator 10 elements are arranged on an equilateral triangular grid resulting in an hexagonal array 20 as depicted in FIG. 2. The omission of the center radiator element 10 (depicted as space 22) is important for further reducing low-angle sidelobes, yielding an hexagonal annulus. The graph of FIG. 2 depicts the actual spacing (in both feet and meters) of the antenna matrix 20. It should be noted that four of the six sides of the matrix 20 are irregular while two are flat. The spacing is 0.66 (+/−0.005) wavelengths. However, other spacings can be used depending upon the frequencies of the radiator elements 10, the total size of the array matrix 20, the location of the matrix and environmental conditions. The many variations possible will occur to one skilled in this art for each application of antenna arrays configured in accordance with the present invention.

Control of antenna arrays 20 are similar to that depicted in FIG. 2 are already well-known in the conventional art. Examples of phased-array systems and their control are found in U.S. Pat. No. 6,037,910 to Solbach at el., and U.S. Pat. No. 5,347,287 to Speciale. Both of these patents disclose control system which can be operated in a manner encompassed the present invention. The particular power distribution of the present invention can be facilitated using systems to those depicted in the two subject patents.

The phase of the RF (Radio Frequency) signal to and from each radiator element is controlled electronically by its internal electronics (microprocessor 16) and by directions received by those electronics, from a controlling computer (not shown). This independent phase control allows one to steer the transmit and receive antenna beams at high rates (10 Hz and faster), and to point the beams anywhere within an acute cone above the antenna, with high pointing accuracy (typically 0.5 degrees or better). This capability permits one to maintain radar beams fixed in angle with respect to the earth despite the movement of platforms (e.g., ships, buoys, and trailers) on which the antenna is mounted.

This capability is important for making accurate measurement of atmospheric winds via radar. It also permits scanning the radar beams in ways not previously possible for radar wind profilers, for example RHI (Range-Height Indicator) and VAD (Velocity Azimuth Display) scans. It likewise permits sun-tracking for intensity calibrations of the radar.

In operation all antenna radiator elements 10 receive a single antenna-relative beam-pointing instruction from the controlling computer (not shown) every 0.1 s, based on externally-sensed motion data and a desired earth-relative beam angle. Each radiator element 10 then looks up in the internal memory of its microcontroller 16 the phase required of it to properly form and point the desired beam, and it switches to that phase at a predetermined time between radar pulses. Each radiator element also monitors forward (outgoing) and reflected power, temperature, and other internal variables, and reports those values to the control computer when polled, to continuously assess radiator element and antenna health.

The non-uniform pattern of power distribution among the elements is derived in a novel manner. First, a matrix is constructed whose elements represent the radiating elements of a rectangular antenna array. Then a two-dimensional fast Fourier transform (2DFFT) is computed from the array matrix. The conjugate square of the elements in the resulting complex matrix represents the array factor radiation pattern in wave number (direction-cosine) space of the hexagonal antenna array with a uniform amplitude distribution. A plot of the radiation pattern reveals the antenna main beam as well as its sidelobe structure.

Certain Fourier coefficients are then altered (typically multiplied by a positive real number less than 1), in effect, reducing the size of selected sidelobes. Then an inverse Fourier transform obtains the amplitude distribution on the antenna elements required to achieve the modified sidelobe structure.

When iterated, the above process allows one to custom-design an amplitude distribution based on unique sidelobe requirements. In the case of the radar wind profiler, the low-elevation sidelobes responsible for ground and sea clutter are selectively reduced only over the anticipated range of antenna steering directions.

Figure 3:
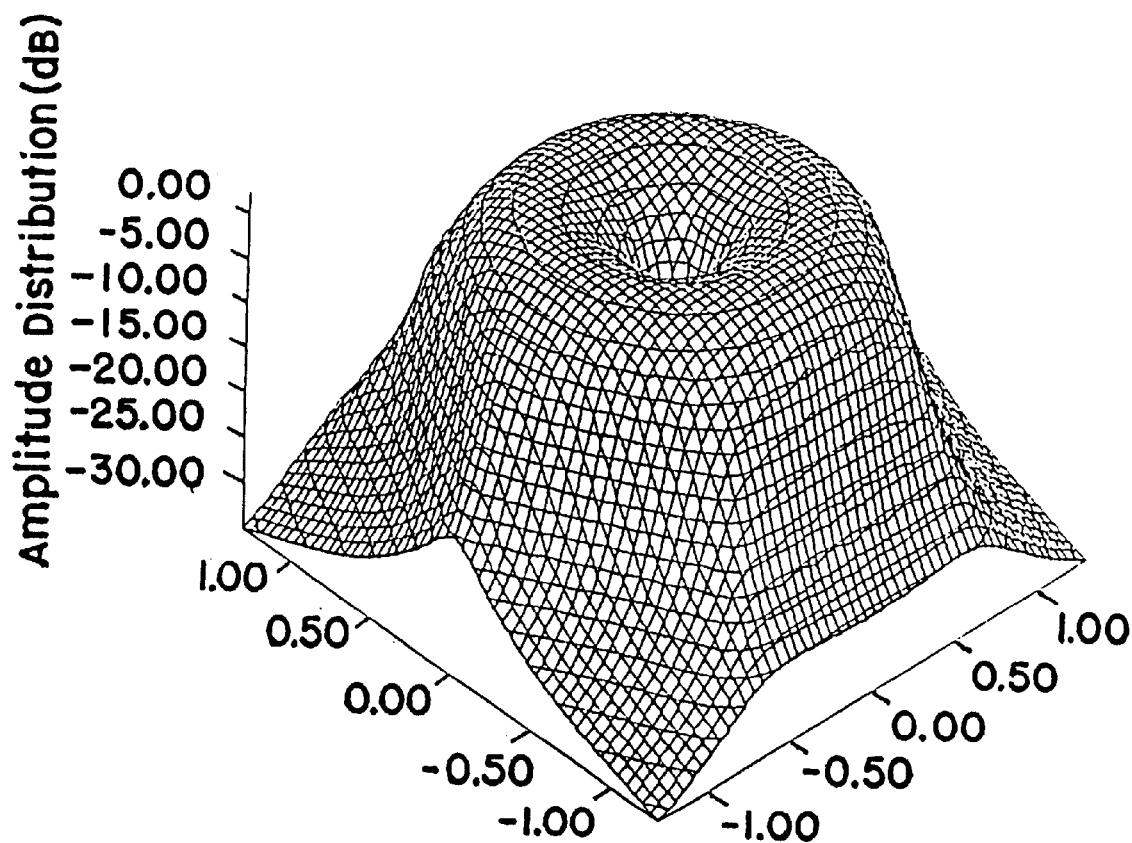
FIG. 3 is a graphic diagram depicting amplitude distribution for a 90 element hexagonal array.

FIG. 3 depicts the resulting annular amplitude distribution on the 90-element hexagonal array of FIG. 2. In this design, maximum power is applied to the elements in a ring that is half way between the center and outer edge of the array. The 6 radiator elements 10 at apexes of the outer edge of the hexagon have the minimum power; one-tenth or −10 dB, relative to the maximum power.

Figure 4:
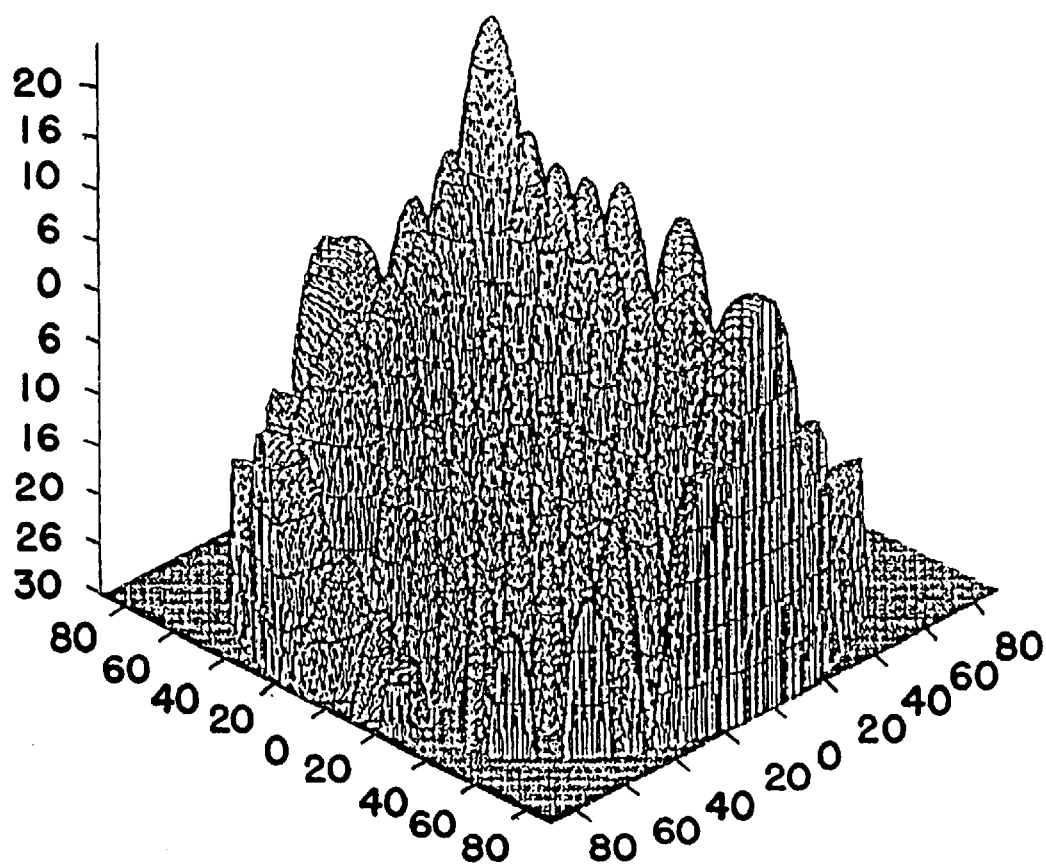
FIG. 4 is a graphic diagram depicting a radiation pattern of a conventional oblique beam.

Conventional wind profilers fielded on moving platforms employ microstrip patch antennas arranged in a 16×16 square array with a uniform amplitude distribution. The radiation pattern of the "oblique" beam (one steered about 20 degrees from vertical) of this antenna is shown in FIG. 4. The "main beam" is the peak of the pattern and significant amounts of power are directed into sidelobes (other lower peaks), the largest of which are aligned in two principal planes. In particular, sidelobes around the edge of the circular plot, representing low-elevation angles, are responsible for ground and sea clutter.

Figure 5:
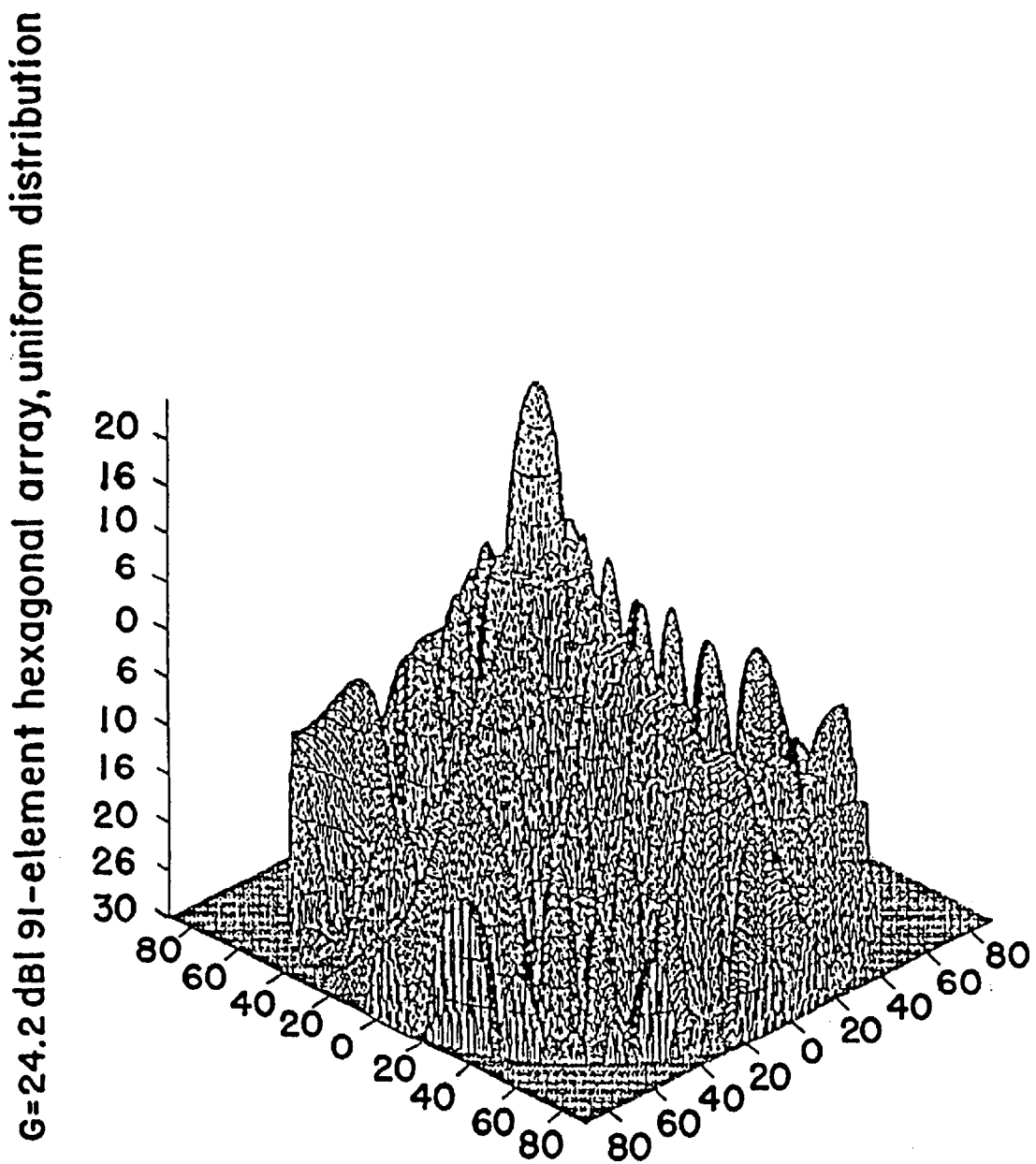
FIG. 5 is a graphic diagram depicting a radiation pattern of a 91-element hexagonal antenna arranged in a triangular lattice.

The radiation pattern of a 91-element hexagonal antenna (with elements arranged in a triangular lattice) of similar aperture and uniform amplitude distribution is depicted in FIG. 5. This element geometry results in sidelobes in three principal planes. The resulting sidelobes are generally lower than the 64-element square array. This simple change in antenna element geometry results in low-element sidelobes that are nearly 20 dB (a factor of 100) lower than a square array.

Figure 6:
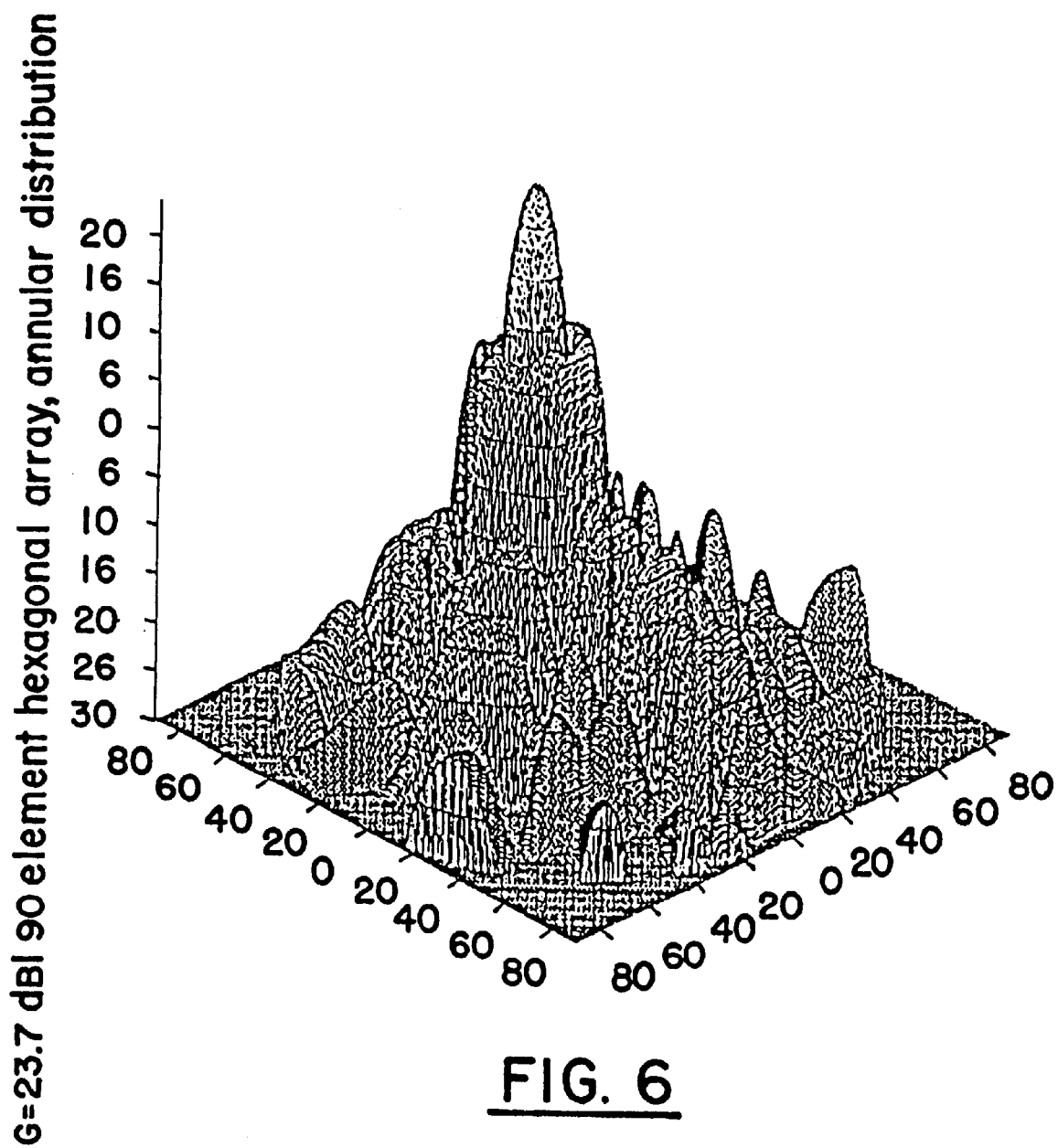
FIG. 6 is a graphic diagram depicting the radiation pattern for a 90-element hexagonal array having an annular amplitude distribution as depicted in FIG. 3.

FIG. 6 depicts the radiation pattern for a 90-element hexagonal array, improved further by the annular amplitude distribution of FIG. 3. This distribution reduces low-angle sidelobes by an additional 8 dB (a factor 6.3) over the uniform amplitude distribution. The sidelobe nearest the main beam is larger than for the uniformly-powered antenna. For wind profiler applications, this is a good trade-off because it reduces the effect of ground and sea clutter.

The hexagonal annulus matrix 20 and non-uniform distribution of RF power to and from the radiator elements 10 results in an antenna pattern with greatly reduced low-angle sidelobes, with respect to previous wind profiler antenna designs of similar aperture, by as much as 30 dB one-way. This design feature eliminates most of the ground- and sea-clutter interference allowed by previous wind profiler antenna designs of the same aperture. This clutter can severely compromise atmospheric wind signals in radar wind profiler systems.

This antenna design eliminates the mechanical gyroscopes and the clutter fence, as well as the mechanical switches used to steer the radar beam. Its size is approximately 3 Diam.×1 H (all in meters). The low-angle, far-field, two-way sidelobes (whether measured as peak or elevation-averaged for all beams) are depressed by more that 60 dB (a factor of 1 million) with respect to the commercial antenna described above.

While a number of embodiments of the present invention have been provided by way of example, the present invention is not limited thereby. Rather, the present invention should be construed to include any an all variations, modifications, permutations, adaptations, derivations and embodiments that would occur to one skilled in this art once having been taught the present invention by the instant application. Accordingly, the present invention should be interpreted only as being limited by the following claims.

I claim:

1. A phased array antenna system arranged for wind profiling and comprising:
    (a) a plurality of transmit/receive radiator elements arranged in a two-dimensional hexagonal configuration matrix, said matrix having a center devoid of said radiator elements.

2. The antenna system of claim 1, wherein each said radiator element comprises a phase shifter.

3. The phased array antenna system of claim 2, wherein said radiator elements are connected by a power distribution and a phase shifter network arranged to provide maximum power to those radiator elements substantially midway between a center of said matrix and outer edges of said matrix.

4. The phased array antenna system of claim 3, wherein said matrix comprises flat sides and irregular sides.

5. The phased array system of claim 4, wherein each said transmit/receive radiator element comprises:
    (a) a microstrip patch radiator;
    (b) a four-bit diode phase shifter; and,
    (c) an eight-bit microcontroller.

6. A method of operating a phased array antenna system having a plurality of transmit/receive radiator antenna elements, arranged in a matrix having a center and a periphery said method comprising the steps of:
    applying power to said antenna radiator elements in a non-uniform manner, so that a majority of said power is applied to radiator elements substantially midway between said center and said periphery of said matrix.

7. The method of claim 6 wherein said radiator elements are arranged in a hexagonal matrix.

8. The method of claim 7 wherein said non-uniform activation of said matrix occurs in an annular configuration, and activation does not occur at said center of said matrix.

* * * * *

UNITED STATES PATENT AND TRADEMARK OFFICE
CERTIFICATE OF CORRECTION

PATENT NO.    : 6,437,738 B1
DATED         : August 20, 2002
INVENTOR(S)   : Daniel C. Law It is certified that error appears in the above-identified patent and that said Letters Patent is hereby corrected as shown below:

<u>Title page,</u>
Please insert Item -- [73] Assignee: Department of Commerce, Washington, D.C. --

Signed and Sealed this

Eleventh Day of November, 2003

JAMES E. ROGAN
*Director of the United States Patent and Trademark Office*